United States Patent
Makino et al.

(10) Patent No.: US 6,649,856 B2
(45) Date of Patent: Nov. 18, 2003

(54) GLAZED CERAMIC ARTICLE, METAL AND CERAMIC ASSEMBLY HAVING GLAZED CERAMIC ARTICLE AND VACUUM SWITCH HAVING METAL AND CERAMIC ASSEMBLY

(75) Inventors: Yusuke Makino, Aichi (JP); Atsushi Inagaki, Aichi (JP)

(73) Assignee: NGK Spark Plug Co., Ltd., Aichi (JP)

( * ) Notice: Subject to any disclaimer, the term of this patent is extended or adjusted under 35 U.S.C. 154(b) by 21 days.

(21) Appl. No.: 09/778,909

(22) Filed: Feb. 8, 2001

(65) Prior Publication Data

US 2001/0027960 A1 Oct. 11, 2001

(30) Foreign Application Priority Data

Feb. 9, 2000 (JP) .................................. 2000-032275

(51) Int. Cl.[7] .............................................. H01H 33/66
(52) U.S. Cl. ...................................... 218/139; 218/118
(58) Field of Search .......................... 428/426, 472; 501/18–20, 21, 24; 218/118, 120, 139, 140, 154

(56) References Cited

U.S. PATENT DOCUMENTS

| | | | | |
|---|---|---|---|---|
| 3,527,649 A | * | 9/1970 | Sullivan | 428/426 |
| 4,256,497 A | * | 3/1981 | Knapp | 106/48 |
| 4,482,790 A | * | 11/1984 | Miyagawa et al. | 218/118 |
| 5,856,015 A | * | 1/1999 | Buchanan | 428/426 |

FOREIGN PATENT DOCUMENTS

| | | |
|---|---|---|
| DE | 40 30 806 A1 | 4/1992 |
| EP | 1 039 485 A1 | 9/2000 |
| JP | 60-166285 | 8/1985 |
| JP | 61-286262 | 12/1986 |

OTHER PUBLICATIONS

European Search Report dated Nov. 20, 2002 for EP 01 30 1154.

* cited by examiner

Primary Examiner—Lincoln Donovan
(74) Attorney, Agent, or Firm—Sughrue Mion, PLLC

(57) ABSTRACT

A glazed ceramic article is provided which comprises a glaze layer formed on an outer surface of a ceramic main body. The glaze layer is made of a glaze comprising 60 to 74% by weight of Si when calculated in terms of $SiO_2$ and 16 to 30% by weight of Al when calculated in terms of $Al_2O_3$. Such a composition can raise the softening temperature and can prevent deterioration of the appearance due to the surface roughening caused at the time of soldering of a metallic member to the ceramic main body after glost firing and deterioration of the insulation ability due to adherence of dirt to the surface of the glaze layer. A metal and ceramic assembly having such a glazed ceramic article, and a vacuum switch having such a metal and ceramic assembly are also provided.

7 Claims, 3 Drawing Sheets

GLAZED CERAMIC ARTICLE, METAL AND CERAMIC ASSEMBLY HAVING GLAZED CERAMIC ARTICLE AND VACUUM SWITCH HAVING METAL AND CERAMIC ASSEMBLY

BACKGROUND OF THE INVENTION

The present invention relates to a glazed ceramic article, a metal and ceramic assembly having the glazed ceramic article, and a vacuum switch having the metal and ceramic assembly.

A vacuum switch is widely used for controlling supply of current for thereby controlling application of high voltage. The vacuum switch includes a pair of contacts disposed within an evacuated ceramic container in order to prevent generation of spark and short of discharge which may be accompanied by cutting off of supply of current for thereby attaining assured insulation. On the outer surface of the ceramic container of the vacuum switch is generally formed a glaze layer for making higher the insulator dielectric strength resistant to the short due to creeping discharge or the like. The glaze layer is also effective for smoothing the surface of the ceramic container for thereby preventing it from becoming dirty and making higher the chemical and mechanical strength.

The glaze layer on a ceramic main body is formed by applying a slurry of glaze on the surface of the ceramic main body and firing it (which firing is called glost firing). A ceramic material generally used for such a container whose insulation is important is alumina. A glaze of a high silicate glass content and of a low melting point is widely used since the glaze layer is formed on a sintered ceramic main body by glost firing at the temperature of 1000 to 1100° C.

SUMMARY OF THE INVENTION

In the meantime, the ceramic container of the vacuum switch has a metal-ceramic joining portion for attaching thereto an arc shield or the like which is disposed within the container for shielding the contacts. Such joining portion is generally formed by soldering. In this connection, since the soldering temperature is lower than the glost firing temperature of the glaze, glost firing is first carried out for attaching the glaze layer to the ceramic container and thereafter a metallic member is soldered to the glazed ceramic container. Further, for reason of requirement with respect to an assembled or completed condition of a glazed ceramic article when it is supplied from a ceramic maker to a switch maker, e.g., for the reason of requirement that the manufacturing steps up to glost firing be allotted to the ceramic maker and the steps of soldering and onward be allotted to a switch maker, the glost firing step needs be carried out previously to the soldering step.

However, for the reason, for example, that glaze having been heretofore used has its softening temperature which is close to a soldering temperature (e.g., 780° in case of widely used Ag—Cu solder), there is sometimes caused an appearance defect due to surface roughening which is considered to be caused during soldering. Further, it is liable to adhere to such a glaze layer whose surface is roughened in this manner a dirt or the like containing a metallic constituent as a major constituent due to contaminants of a furnace (for example, metal, metal oxide or the like under high steam pressure), thus being causative of lowering the insulating ability. It is presumed that such a phenomenon is caused for the reason that the surface section of the glaze layer is softened a little to allow bubbles contained in the glaze layer to be actualized or appear at the surface section. Such a phenomenon is particularly liable to occur when the soldering step is carried out under a high vacuum condition of $1\times10^{-6}$ torr or less.

It is accordingly an object of the present invention to provide a glazed ceramic article whose glaze layer is higher in softening temperature as compared with a conventional glaze layer and which is hard to deteriorate the insulation ability or the like due to surface roughening and adherence of dirt at the time soldering of, for example, metallic members.

It is a further object of the present invention to provide a metal and ceramic assembly having the glazed ceramic article of the foregoing character.

It is a further object of the present invention to provide an insulator for support of a transmission line which has the glazed ceramic article of the foregoing character.

It is a further object of the present invention to provide a vacuum switch having the metallic and ceramic assembly of the foregoing character.

To accomplish the above objects, there is provided according to an aspect of the present invention a glazed ceramic article comprising a main body made of ceramic, and a glaze layer formed on an outer surface of the main body, the glaze layer being made of a glaze comprising 60 to 74% by weight of Si when the weight percentage is calculated in terms of $SiO_2$ and 16 to 30% by weight of Al when the weight percentage is calculated in terms of $Al_2O_3$.

The above described glazed ceramic article is characterized in that the composition of the glaze layer is set so as to contain 60 to 74% by weight of a $SiO_2$ constituent which is a major constituent of a glassy substance and 16 to 30% by weight of, i.e., a large quantity of an $Al_2O_3$ constituent (alumina constituent) which has a high melting point. As a result, the softening temperature of the glaze layer can be raised, thus making it possible to prevent deterioration of the appearance of the glaze layer due to its surface roughening at the time of soldering of a metallic member to the ceramic main body, particularly soldering in a high vacuum, for thereby preventing deterioration of the insulation ability due to adherence of dirt to the glaze layer. Further, even in case the glazed ceramic article is used without being soldered thereto a metallic member, it can effectively prevent roughening of the surface of the glaze layer when it is used in a high temperature atmosphere.

When the weight percentage content of Al when calculated in terms of or by conversion to $Al_2O_3$ (hereinafter referred to as WAl2O3 (% by weight)) becomes smaller than 16% by weight, the melting point of the glaze layer is lowered, thus allowing the effect of the present invention to become insufficient. On the other hand, when WAl2O3 exceeds 30% by weight, the glost firing temperature becomes too high, thus inevitably increasing the manufacturing cost. On the other hand, when the weight percentage content of Si when calculated in terms of $SiO_2$ becomes smaller than 60% by weight, there may possibly occur such a case wherein the glaze layer cannot obtain a sufficiently high strength and insulation ability. Further, when WSiO2 exceeds 74% by weight, the flowability of the glaze layer becomes insufficient and it may possibly become difficult to raise the melting point of the glaze layer sufficiently. In the meantime, it is more preferable that WAl2O3 ranges from 17 to 23% by weight, and it is more preferable that WSiO2 ranges from 67 to 72% by weight.

The glaze layer of the glazed ceramic article of this invention may contain secondary constituents other than Al and Si so long as the above described effect is not deteriorated. Particularly, in order to adjust the melting point (or softening temperature) of the glaze and make higher the smoothness or flatness of the glaze layer, which is attained by applying a suitable fluidity to the glaze layer at the time of glost firing, the glaze layer may contain proper quantities of alkali metal constituents (particularly, Li, Na, K) or alkali earth metal constituents (particularly, Ca). In any event, it is desirable to adjust the composition of the glaze layer so that the melting point of the glaze is within the range from 1100 to 1400° C., whereby to effectively prevent the surface roughening of the glaze layer and adherence of dirt to same which are otherwise caused at the time of soldering and prevent an excessive rise of the glost firing temperature.

The melting point of the glaze layer is herein defined as a liquidus temperature. The liquidus temperature of the glaze layer formed on the ceramic main body is determined by a heat analysis of a specimen of the glaze layer. Namely, the specimen is prepared by separating a glaze layer from a ceramic main body and subjected to a heat analysis such as DSC (Differential Scanning Calorimetry) and DTA (Differential Thermal Analysis). The liquidus temperature is determined from the temperature of the specimen at the end of an endothermic peak which is the last peak appearing at the time of a temperature rise in the analysis. Further, in case it is difficult to prepare sufficient specimens, the Al, Si and other cationic constituent contents (however, elements of extremely small quantities, i.e., elements of the quantities of less than 0.5 wt % are excluded) are analyzed by EPMA (Electron Probe X-ray Microanalyzer), XPS (X-ray Photoelectron Spectroscopy) or chemical analysis to obtain the compositions which are converted oxides (however, the compositions are converted to oxides having stoichiometric compositions by considering that the valence of oxygen is −2, the valence of cations in the 1A group of the periodic table of the elements is +1, the valance of cations in the 2A group is +3, the valance of cations in the 3A group is +3, the valance of cations in the 4A group is +4, the valance of cations in the 5A group is +5, the valance of cations in the 6A group is +6, the valance of cations in the 7A group is +4, the valance of cations in the 8 group is +3, the valance of cations in the 1B group is +1, the valance of cations in the 2B group is +2, the valance of cations in the 3B group is +3, and the valance of cations in the 4B group is +4). Then, specimens of glass are prepared so as to have the compositions nearly equal to those obtained by the above analysis by mixing and melting the raw materials of oxides of the cationic constituents and thereafter rapidly cooling them. From the melting points of the glass specimens, the melting points of the glaze layers formed on the ceramic articles are estimated.

In case a metallic member is joined to a glazed ceramic main body by way of a solder layer, it is desired that the melting point of the glaze is higher than the melting point of the solder layer by 100° C. or more.

For example, in case a metallic member made of ferrous metal (e.g., Fe—Ni) is soldered to a main body made of alumina ceramic, an active solder containing an active metal constituent such as Ti and Zr can be used. In this instance, for the basic composition of the solder to which an active metal constituent is to be added, can be used an Ag—Cu alloy (Ag—Cu solder). The Ag—Cu alloy does not form an intermetallic constituent with an active metallic constituent such as Ti and has a melting point which is not so high and has a good ability to be joined with ferrous metals, thus being quite desirable for use in the present invention.

In case a metallic member made of ferrous metal containing Ni is joined to a ceramic main body made of alumina ceramic by way of a solder layer, primary soldering for metallizing a joining surface of the ceramic main body can be carried out by using a primary solder containing one kind, two kinds or more kinds of active metal constituents selected from Ti, Zr and Hf, and thereafter secondary soldering can be carried out for secondarily soldering the metallic member to the metallized joining surface of the ceramic main body by using a secondary solder which is lower in the melting point and smaller in the active metal content than the primary solder. In this instance, as such a secondary solder can be used the above described Ag—Cu solder. As such a Ag—Cu alloy can be used, for example, a silver solder such as BAg-8 described in JIS (Japanese Industrial Standard) Z3261.

The glaze constituting the glaze layer is desired to comprise 80% or more by weight of $WSiO_2+WAl_2O_3$ from a point of view of raising the softening temperature of the glaze layer. However, in order to prevent the melting point of the glaze from becoming excessively high and adjust the softening point of the glaze to a proper value, it is desired to add 3 to 20% by weight of alkali metal elements which is the content calculated in terms of oxide. The alkali metal elements are effective for adjusting the softening point of the glaze to a low temperature side. However, when the content is less than 3% by weight, the alkali metal cannot produce prominent effect. When the content is 20% or more by weight, the softening temperature is lowered excessively and the insulating ability of the glaze layer tends to be deteriorated. In the meantime, it is preferable to add alkali metal elements by the quantity within the range from 5 to 18% by weight when the weight percentage content is calculated in terms of oxides.

Then, when the glazed ceramic article of this invention is used for a vacuum switch and insulator which are required to have a high insulating ability, it is preferably to form the ceramic main body from alumina ceramic (e.g., alumina ceramic whose Al content is 85% or more by weight when calculated in terms of $Al_2O_3$). Further, by forming a glaze layer having an increased alumina content as described above on an alumina ceramic main body, the adhering quality of the glaze layer can be made higher, and the difference in the coefficient of linear expansion between the main body and the glaze layer is made smaller, thus being hard to cause a crack or cracks or crazing at the time of cooling after glost firing.

DESCRIPTION OF THE PREFERRED EMBODIMENTS

Figure 1:
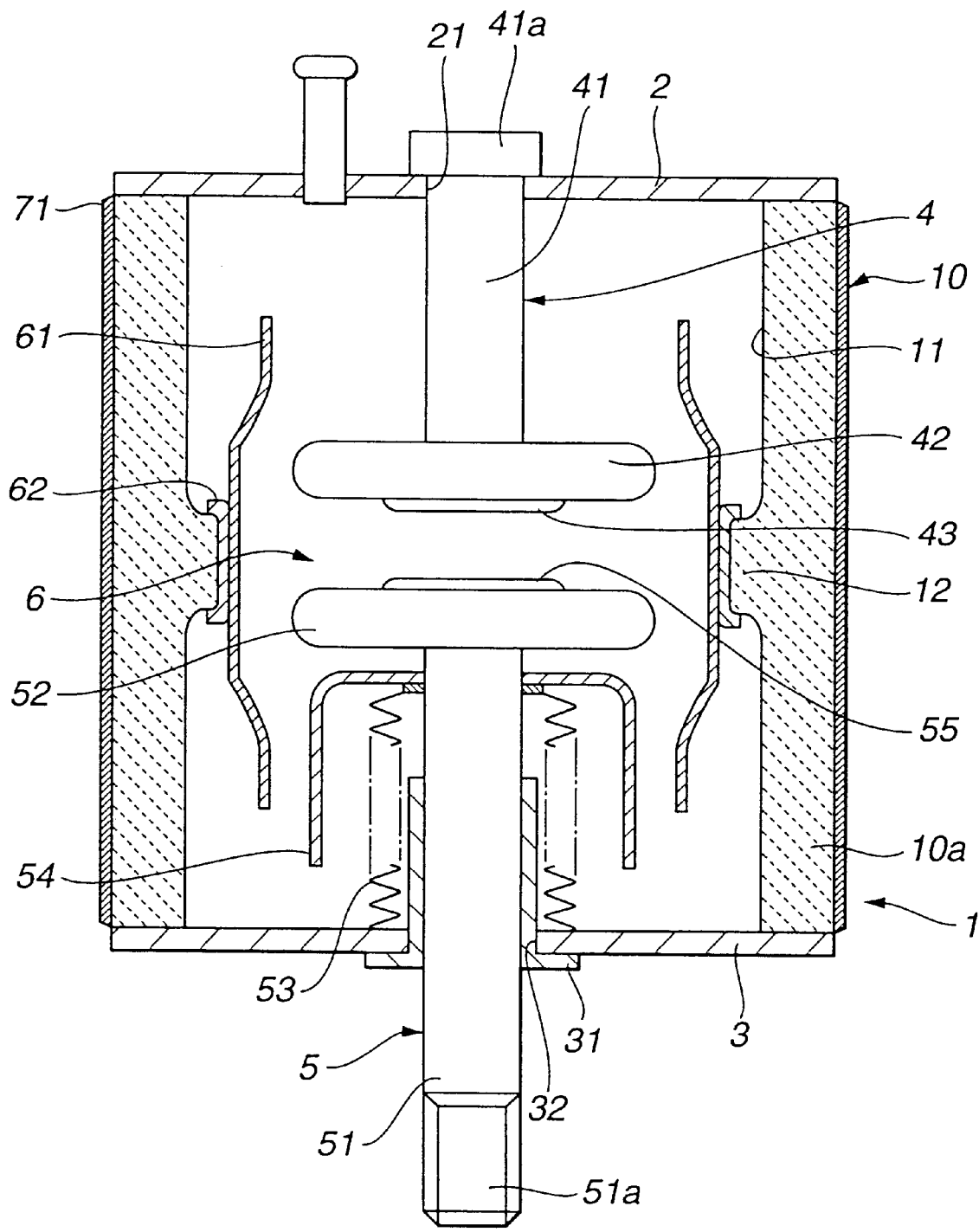
FIG. 1 is a schematic sectional view of a vacuum switch according to an embodiment of the present invention.

Referring first to FIG. 1, a vacuum switch according to an embodiment of the present invention is generally indicated by 1. The vacuum switch 1 includes a container or tubular member 10 which embodies a glazed ceramic article according to the present invention. The tubular member 10 has on the outer circumferential surface thereof a glaze layer 71. Inside of the tubular member 10 is disposed a metallic, tubular arc shield 61. The arch shield 61 which serves as a metallic member is joined to the inside of the tubular member 10 by way of a solder layer 62. Specifically, the arc shield 61 is joined to a main body 10a of the tubular member 10 to constitute a metal and ceramic assembly of the present invention.

In this embodiment, the tubular member 10 has at the inner circumferential surface thereof a radially inward protrusion 12. To the inner circumferential surface of the protrusion 12 is joined by way of a solder layer 62 the outer circumferential surface of the arc shield 61. The main body 10a of the tubular member 10 is made of alumina ceramic (e.g., 92% by weight of alumina). On the other hand, a glaze layer 71 is made of glass ceramic consists of 60 to 74% by weight of Si (when calculated in terms of or by conversion to $SiO_2$) and 16 to 30% by weight of Al (when calculated in terms of or by conversion to $Al_2O_3$). Further, the solder layer 62 is made of a solder material consisting of a Ag—Cu solder as a major constituent (major constituent is herein used to indicate a constituent whose total percentage content is 50% or more by weight and which is of such a concept encompassing element, compound and phase). Between the solder layer 62 and the main body 10a is formed a reaction layer consisting of an activated metal constituent (e.g., Ti) and ceramic.

The above described tubular member 10 is provided with a pair of cover members 2 and 3 for closing and shielding the axial ends thereof and thereby defining a shielded switch space 11. A stationary electrode 4 is provided which extends through the cover member 2 and has a stationary shaft 41 at which it is fixedly attached to the cover member 2. The stationary shaft 41 has a stationary terminal portion 41a disposed outside the shielded switch space 11. The stationary electrode 4 further has a stationary switch contact portion 42 at an end portion disposed inside the shielded switch space 11. Further, a movable electrode 5 is provided which extends through the cover member 3 and has a movable shaft 51 axially movably supported on the cover member 3. By this, the movable electrode 3 is movable axially of the tubular member 10. The movable shaft 51 has a movable terminal portion 51a at an end portion disposed outside the shielded switch space 11. The movable electrode 5 further has a movable switch contact portion 52 at an end portion disposed inside the shielded switch space 11. The movable contact portion 52 is movable so as to be brought into or out of contact with the stationary switch contact 42. The arc shield 61 is disposed so as to surround, within the tubular member 10, the stationary switch contact portion 42 and the movable switch contact portion 52.

Specifically, the cover members 2 and 3 are in the form of a circular cover plate and made of, for example, Fe—Ni—Co alloy (e.g., alloy sold under the trade name of Kovar and consisting of 29% by weight of Ni, 17 to 18% by weight of Co and the remainder of Fe). The cover members 2 and 3 have at the central portions thereof holes 21 and 32 in which the stationary electrode 4 and a guide 31 are fixedly held, respectively. The guide 31 is made up of a ceramic bushing and adapted to support the movable shaft 51 of the movable electrode 5 in a way as to enable the movable shaft 51 to be slidable smoothly thereon.

The stationary shaft 41 is fixedly attached to the hole 21 at an end portion and has at the other end portion the stationary switch contact portion 42 in the form of a circular disk. The movable shaft 51 has at an end portion thereof the movable switch contact portion 52 in the form of a circular disk. In the meantime, the movable electrode 5 is driven toward and away from the stationary switch contact 42 by means of a metallic bellows 53 installed on the movable shaft 51. The metallic bellows 53 is surrounded by a bellows cover 54 and thereby protected from direct contact with metallic vapor produced by the contact portions 42 and 52 (contacts 43 and 55).

The contacts 43 and 55 are made of a high melting point metal (e.g., tungsten alloy) and constitute a switch section 6 where the stationary switch contact portion 42 and the movable switch contact portion 52 are brought into or out of contact with each other. Further, the arc shield 61 prevents the above described metallic vapor from being adhered to the inner wall of the tubular member 10 to deteriorate the insulating ability of same.

The above described vacuum switch 1 is produced, for example, in the following manner. Firstly, ceramic powder for forming the tubular member 10 is prepared by wet blending of alumina ceramic powder added with sintering additive, organic binder and solvent and thereafter by granulation of the mixture by spraying or the like. The ceramic powder thus prepared is formed into a tubular shape by means of a rubber press. The thus formed tubular part is subjected to outer surface grinding for grinding the outer circumferential surface thereof and inner surface grinding for forming the protrusion 12. Thereafter, the formed part is sintered at a predetermined temperature (e.g., about 1600° C.) for thereby producing the sintered alumina main body 10a.

On the other hand, a glaze slurry is prepared in the following manner.

Firstly, powders for Si and Al constituents and an auxiliary cation constituent (e.g., alkali metal element such as K) are mixed in the ratio of 60 to 74% by weight of Si when calculated in terms of $SiO_2$, 16 to 30% by weight of Al when calculated in terms of $Al_2O_3$ and 20% or less by weight of alkali metal element M when calculated in terms of MO. The mixed powders are then added with water or water mixed with a proper quantity of solvent and crushed and mixed by trommel mixing to obtain the glaze slurry. In the meantime, for the constituent raw material powders can be used simple substance oxides of $SiO_2$, $Al_2O_3$ and CaO, metallic salt (e.g., $K_2CO_3$) which is inverted to oxide by sintering or minerals (e.g., limestone and silica). Further, composite oxides containing plural kinds of cations or double salts, or natural or synthetic minerals containing such composite oxides or double salts as major constituents (e.g., feldspar ((Na, K) $Al_2Si_3O_8 CaAl_2Si_3O_8$), kaolin $(Al_2Si_2O_5(OH)_4$ $[Al_2O_3.2SiO_2.2H_2O])$. Further, the glaze slurry can be obtained by heating the mixture of the constituent raw material powders at 1300 to 1700° C. and melting it, then throwing the melted mixture into the water to make it cooled rapidly and vitrified, thereafter crushing the vitrified mixture to form glaze frit, and mixing the glaze frit with a proper quantity of organic binder (may be added with kaolin and mineral clay such as gairome clay according to the necessity) and further with water.

The above described glaze slurry is sprayed and applied to the outer circumferential surface of the main body 10a to form a glaze slurry layer which is a glaze powder accumulation layer, and then the applied slurry layer is dried. Thereafter, the slurry layer is subjected to glost firing to form the glaze layer 71.

Then, a solder paste (e.g., activated Au—Cu solder containing an active metal constituent of Ti) for forming the solder layer 62 is applied to the inner side surface of the protrusion 12 of the main body 10a. On the solder paste is placed and held stationarily by using a suitable jig the arc shield 61. The arc shield 61 is soldered to the inner surface of the protrusion 12 of the main body 10a by being held within a high vacuum atmosphere of $1\times10^{-7}$ torr and heated at the temperature of 800 to 900° C. In this instance, since the glaze layer 71 is made of a glaze having the above described composition, the softening temperature of the glaze layer 71 is so high that there are hardly caused deterioration of an appearance due to surface roughening of the glaze layer 71 and deterioration of the insulating ability due adherence of dirt.

Thereafter, by installing various parts shown in FIG. 1 on the main body 10a, the vacuum switch 1 is completed.

Figure 2:
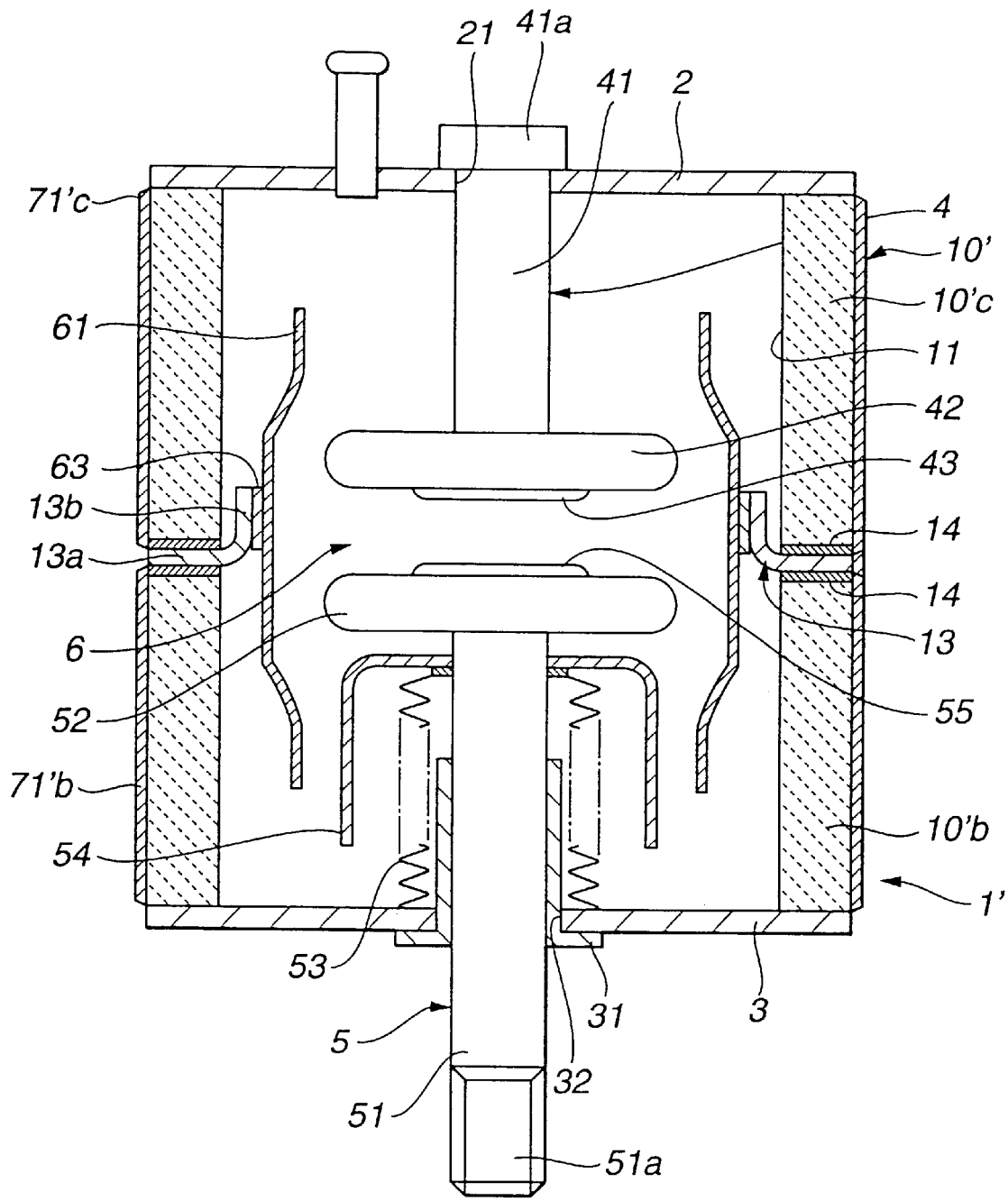
FIG. 2 is a view similar to FIG. 1 but shows a variant of the vacuum switch of FIG. 1.

FIG. 2 shows a vacuum switch 1' according to a modification of the present invention. In this embodiment, attachment of the arc shield 61 to the main body 10a of the tubular member 10 is modified. Specifically, the main body of the tubular member 10' is divided at an axially intermediate place thereof into a first tubular portion 10'b and a second tubular portion 10'c. The first and second tubular portions 10'b and 10'c are joined together by way of a connecting member 13. The connecting member 13 has a tubular portion 13b and a flange portion 13a protruding radially outward from an axial end of the tubular portion 13b. The flange portion 13a is interposed between the first and second tubular portions 10'b and 10'c and joined at the opposite side surfaces thereof to the corresponding axial ends of the first and second tubular portions 10'b and 10'c by solder layers 14 and 14. The solder layer 14 is made of substantially the same material as the solder layer 62 in FIG. 1. On the other hand, to the inner circumferential surface of the tubular portion 13b of the connecting member 13 is joined the outer circumferential surface of the arc shield 61 by way of a solder layer 63. The solder layer 63 can be made of such a solder alloy whose major constituent is Ag—Cu but is not needed to contain an active metal constituent such as Ti.

In the above described structure, the first tubular portion 10'b and the second tubular portion 10'c are first formed with glaze layers 71'b and 71'c, respectively. Thereafter, the connecting member 13 with solder films on the opposite side surfaces of the flange portions 13a, is interposed between the axial ends of the first tubular portion 10'b and the second tubular portion 10'c and soldered to same under the same condition as that of the embodiment of FIG. 1. By forming the glaze layers 71'b and 71'C from a glaze having the same composition as the glaze layer 71 of FIG. 1, this embodiment can produce substantially the same effect as the embodiment of FIG. 1.

Figure 3:
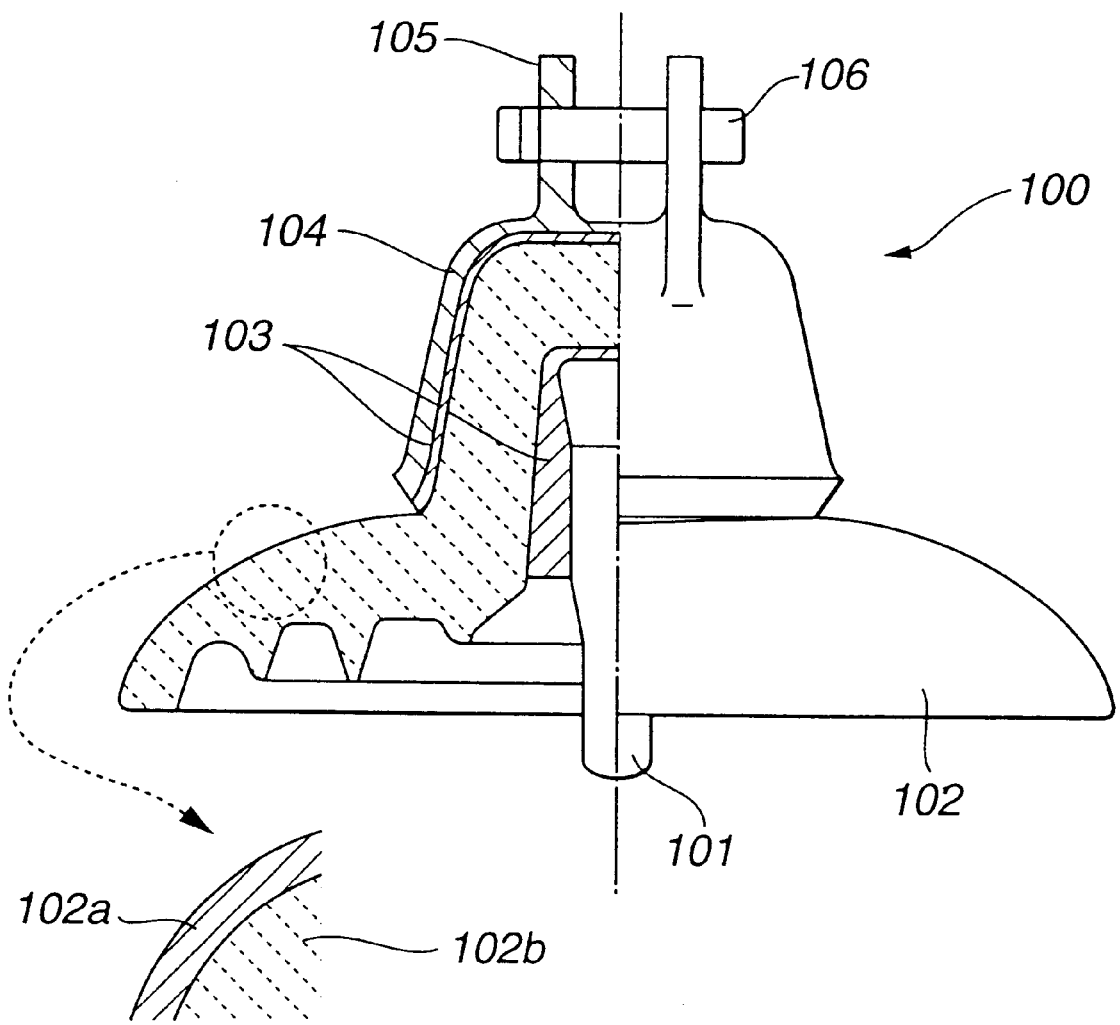
FIG. 3 is a sectional view of an insulator according to a further embodiment of the present invention.

In the meantime, application of the glazed ceramic article of the present invention is not limited to the above described container or tubular member of the vacuum switch but to other devices such as insulators. FIG. 3 shows an insulator embodying the present invention.

Referring to FIG. 3, an insulator is of a clevis type suspension insulator for support of a transmission line and generally indicated by 100. The insulator 100 includes a hard paste porcelain member 102, a cap 104 made of malleable cast iron or carbon steel, a pin 101 cooperating with the cap 104 to clamp therebetween the porcelain member 102, and cement layers 103 and 103 for bonding the cup 104 and the pin 101 to the porcelain member 102. The hard paste porcelain member 102 constitutes a glazed ceramic article embodying the present invention and has a main body 102b made of alumina ceramic and a glaze layer 102a covering the surface of the main body 102b. The glaze layer 102a is made of glaze having the above described composition. However, the joining surface portion of the main body 102b to which the cement layer 103 is joined is not necessarily provided with the glaze layer 102a. In the insulator 100 having the above described structure, the cap 104 has an upper end portion 105 at which it is connected to a support (not shown) by means of a cotter pin 106 to hang from same.

The glaze layer 102a has the same composition as the glaze layer 71 of FIG. 1. This embodiment thus can produce substantially the same effect as the embodiment of FIG. 1.

To confirm the effect of the present invention, the following experiment was performed. The main body 10a shown in FIG. 1, which is 70 mm in outer diameter, 60 mm in inner diameter and 100 mm in length and whose protrusion was 5 mm in height and 10 mm wide, was made of alumina ceramic in the above described manner. However, the composition of the alumina ceramic was 92% by weight of $Al_2O_3$, 5% by weight of $SiO_2$, 2% by weight of CaO and 0.1% by weight of MgO. On the other hand, the glaze slurry was prepared in the following manner. Firstly, various raw materials were prepared by mixing feldspar powder, Kaolin powder, silica stone powder and limestone powder in various proportions. The mixed powders were then added with proper quantities of binder and water and crushed and mixed by trommel mixing to obtain glaze slurries.

The glaze slurry was sprayed onto the surface of the main body by means of a spray nozzle and then dried to form a glaze slurry layer. In the meantime, the glaze slurry layers were about 800 $\mu$m thick after dried. The glaze slurry layers were subjected to glost firing at various temperatures to obtain specimens of tubular members with various glaze layers. On the other hand, such glaze specimens were prepared which were not subjected to crushing but solidified and formed into the lumps. In the meantime, it was recognized by the X-ray diffraction method that the glaze specimens were vitrified (noncrystalline). By using the above described specimens of tubular members and glaze specimens, the following experiments were performed.

(1) Chemical Composition Analysis: The chemical composition was determined by fluorescent X-ray analysis. The analysis values of specimens (calculated in the term of oxide) were shown in Table 1. In the meantime, the compositions of the glaze layers which were produced by glost firing were measured by EPMA (electron probe X-ray microanalyzer), and from this measurement it could be confirmed that the analysis values of the glaze layers produced by glost firing nearly coincided with those resulting from the measurement of the specimens in the from of lumps.

(2) Melting Temperature: Differential thermal analysis was performed while heating powder specimens each in the quantity of 50 mg, wherein measurement started at the room temperature and the temperature at the end of the second endothermic peak was measured and regarded as the melting temperature (liquidus temperature).

Then, the soldering process of the arc shield made of Fe—Ni alloy containing 42% by weight of Ni and the remainder of Fe was performed by using an active solder of the composition of 68% by weight of Ag, 27% by weight of Cu, and 5% by weight of Ti, in a vacuum of $1.0 \times 10^{-7}$ torr, at the temperature of 850° C., and for 0.5 hour. After the soldering process, the appearance of each solder layer was checked by visual inspection. In the meantime, judgment was made on the following aspects.

(1) Dirt and Color change: An example apparently dirty or soiled was judged as bad (X) and not was as good (○).

(2) Glaze Melting Condition: An example wherein melting of the glaze was insufficient was judged as bad (X), and an example wherein a large defect in melting was not found was judged as good (○).

In the meantime, a specimen of a metal-ceramic joining portion including a solder layer was cut away from a glazed ceramic article, and the melting point (liquidus temperature) was measured. From this, it was found that the liquidus temperature was about 780° C. (the liquidus temperature was regarded as the temperature at the end of the last endothermic peak). The result was shown in Table 1.

From Table 1, it will be understood that by using the glaze of this invention the glaze layer subjected to glost firing at the temperature of about 1400° C. can attain a fired surface of a good appearance and it becomes possible to make the glaze layer be hard to cause color charge at the time of soldering.

The entire content of Japanese Patent Application P2000-32275 is incorporated herein by reference.

Although the invention has been described above by reference to certain embodiments of the invention, the invention is not limited to the embodiments described above. Modifications and variations of the embodiments described above will occur to those skilled in the art, in light of the above teachings. The scope of the invention is defined with reference to the following claims.

TABLE 1

| | Composition of glaze (wt. %) | | | Melting point of glaze (° C.) | Glost firing (° C.) | Dirt/Color change at soldering | | Appearance of glaze | |
|---|---|---|---|---|---|---|---|---|---|
| | SiO$_2$ | Al$_2$O$_3$ | X* | | | | | | |
| 1 | 77 | 13 | 10 | 1080 | 1400 | Color change | X | Excessive melting | X |
| 2 | 74 | 16 | 10 | 1100 | 1400 | Good | ○ | Good | ○ |
| 3 | 70 | 20 | 10 | 1130 | 1400 | Good | ○ | Good | ○ |
| 4 | 67 | 23 | 10 | 1150 | 1400 | Good | ○ | Good | ○ |
| 5 | 60 | 30 | 10 | 1220 | 1400 | Good | ○ | Good | ○ |
| 6 | 50 | 40 | 10 | 1400 | 1500 | Good | ○ | Slightly insufficient melting | X |
| 7 | 45 | 45 | 10 | 1500 | 1600 | Good | ○ | Slightly insufficient melting | X |
| 8 | 78 | 22 | 0 | 1720 | 1800 | Good | ○ | Slightly insufficient melting | X |
| 9 | 74 | 21 | 5 | 1300 | 1400 | Good | ○ | Quite slightly insufficient melting | ○ |
| 10 | 66 | 19 | 15 | 1150 | 1400 | Good | ○ | Good | ○ |
| 11 | 63 | 17 | 20 | 1250 | 1400 | Good | ○ | Good | ○ |

*Component X is alkaline metal + alkaline earth metal (weight percent contents are calculated in the terms of oxides, K$_2$O:Na$_2$O:CaO = 8:2:1)

What is claimed is:

1. A vacuum switch comprising:

a metal and ceramic assembly having a tubular member made of ceramic, and a tubular arc shield made of metal, disposed inside the tubular member and soldered to the tubular member, the tubular member having on an outer circumferential surface a glaze layer, the glaze layer being made of a glaze comprising Si in an amount of 60 to 74% by weight when calculated in terms of SiO$_2$ and Al in an amount of 16 to 30% by weight when calculated in terms of Al$_2$O$_3$;

a pair of cover members for closing axial ends of the tubular member to define a shielded space;

a stationary electrode extending through one of the cover members and having a stationary terminal portion outside the shielded space and a stationary switch contact portion disposed inside the shielded space; and a movable electrode extending through the other of the cover members and movable axially of the tubular member, the movable electrode having a movable terminal portion disposed outside the shielded space and a movable switch contact portion disposed inside the shielded space and movable toward and away from the stationary switch contact portion;

the arc shield being disposed so as to surround the stationary switch contact portion and the movable switch contact portion.

2. A vacuum switch according to claim 1, wherein the tubular member has on an inner circumferential surface thereof a radially inward protrusion, the arc shield being soldered at an outer circumferential surface thereof to an inner circumferential surface of the protrusion.

3. A vacuum switch according to claim 1, wherein the tubular member is axially divided into a pair of first and second tubular portions and provided with a connector, the connector being made of metal and having a tubular body portion and a flange portion protruding radially outward from an axial end of the body portion, the flange portion being interposed between and soldered to axial ends of the first and second tubular portions, and the outer circumferential surface of the arc shield being soldered to an inner circumferential surface of the tubular body portion of the connector.

4. The vacuum switch according to claim 1, wherein the glaze has a melting point ranging from 1100 to 1400° C.

5. The vacuum switch according to claim 1, wherein the glaze comprises Si and Al in an amount of 80% or more by weight, where the weight percentage content of Si is calculated in terms of SiO$_2$ and the weight percentage content of Al is calculated in terms of Al$_2$O$_3$.

6. The vacuum switch according to claim 1, wherein the glaze comprises 3 to 20% by weight of alkali metal elements calculated in terms of their respective oxides.

7. The vacuum switch according to claim 1, wherein said glaze layer is an insulating glaze layer.

* * * * *